July 20, 1937.   C. BANSCHER   2,087,716
METHOD OF SOLDERING ALUMINUM OR ALUMINUM ALLOYS
Filed Dec. 30, 1933
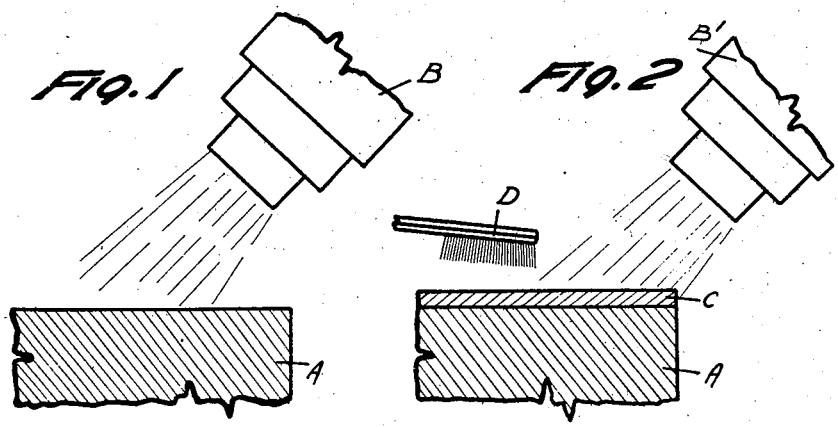
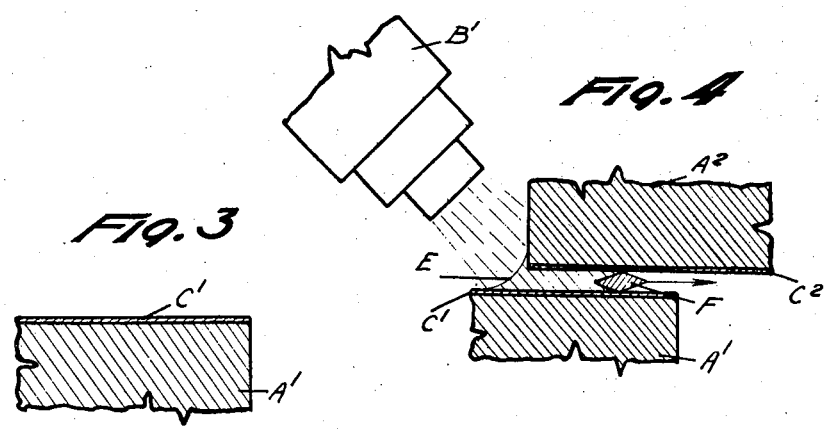
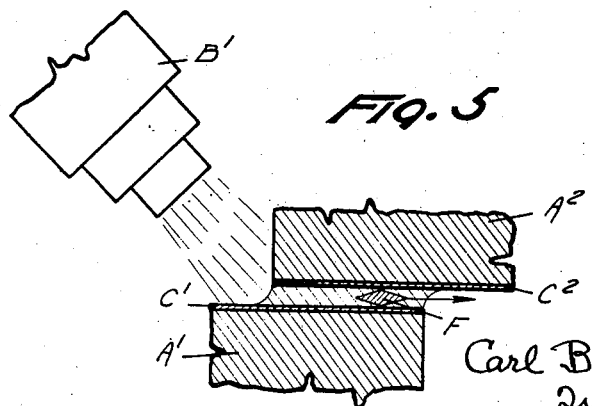
Carl Banscher
Inventor,
by Morrison, Kennedy & Campbell
Attorneys.

Patented July 20, 1937

2,087,716

UNITED STATES PATENT OFFICE 2,087,716

METHOD OF SOLDERING ALUMINUM OR ALUMINUM ALLOYS

Carl Bänscher, Basel, Switzerland

Application December 30, 1933, Serial No. 704,785
In Germany January 7, 1933

1 Claim. (Cl. 113—112)

The present invention relates to an improved method of soldering aluminum, i. e., uniting separate pieces of aluminum or aluminum alloy by a solder for which the aluminum has an alloying attraction.

Generally the soldering of aluminum or aluminum alloys, when performed, without use of fluxes, is carried out according to known methods in the following manner:

The surfaces which are to be joined together are firstly cleaned, and preferably roughened by means of a scraper, a wire brush, an emery cloth, a file or the like. Sometimes grooves are made in the roughened surfaces. The surfaces are then heated and rubbed with a solder till they are entirely coated with molten solder. During this step the solder takes up some of the aluminum oxide which has formed again after the cleaning, so that the solder adheres at those places where the oxide film has become actually destroyed. It is only at these places that an alloying between the aluminum base and the solder can be realized and the remainder of the surface remains with oxide. The solder is rubbed on either by means of the solder stick itself or by means of a wire brush, which is sometimes combined with a soldering tool. Then is removed the dross or slag which may be formed and thereupon the pieces to be joined are put into the final and intended position, a new quantity of fresh solder is added and the soldering is accomplished. During this last operation the heating is naturally continued, preferably indirectly.

The drawbacks of this method are well known. One cannot rely upon the mechanical strength of such soldering and the resistance to corrosion is relatively little. Attempts have been made to improve the composition of the solder, however without success. It is believed that the real problem and the reason for the drawbacks has not been recognized until the present invention. During the first operation one is never certain that the adherence between the solder and the aluminum is complete, as the unalloyed solder covers and conceals the whole treated surface; one may be satisfied with a delusive and imperfect adherence. With this former practice the adherence seems to be complete as soon as the molten solder wholly covers the prepared surface and ceases to withdraw as a non-wetting liquid. But nevertheless this is a delusion, as the solder does not withdraw as soon as an adherence, that is to say an alloying, takes place on certain spots which are sufficiently near to other spots; the solder may bridge across from alloyed spots to alloyed spots, which causes the delusion. In this way one makes apparently perfect solderings, which are mechanically unreliable. Furthermore all the known methods which do not make use of fluxes have the disadvantage that the aluminum oxide, which comes off from the destroyed oxide film of the aluminum, is not eliminated by the rubbing with the solder, but is merely taken up by the solder. The resistance to corrosion of the solder which is polluted in this way is much diminished, as the oxide particles enclosed in the solder are causes of corrosion.

The present invention eliminates these drawbacks. It relates to a method which ensures a perfect and complete adherence between the solder and the aluminum and the thorough elimination of the oxides.

According to this invention, the surfaces which are to be united are firstly cleaned, preferably roughened and then heated comformably to known methods. The temperature must reach at least the melting point of the solder. One brushes or rubs then intensively the cleaned surfaces and applies a molten solder to them, and continues applying solder and brushing until one can verify with the eye that these surfaces are entirely covered with a very thin layer of alloy formed from the aluminum surface and the solder. Contrary to the known methods, one eliminates completely by means of a brush or by equivalent implement the surplus solder which has not become alloyed with the aluminum. Only a very thin alloy layer is allowed to remain on the surfaces to be soldered, so that one cannot be deluded by the appearance of a perfect adherence between the solder and the aluminum. Owing to the brushing or rubbing and to the removing of the unalloyed solder the oxide film which had coated the aluminum is eliminated too, thus ensuring a complete adherence.

After this preparation the pieces to be joined by soldering are put into the final or desired relation or position and are supplied with fresh solder. One obtains in this way a far better attachment than according to the known processes as the adherence of the solder to the aluminum is a perfect one. As the aluminum oxide has been replaced by the aluminum-solder alloy, the resistance to corrosion of the parts soldered with the same solder is better with the present invention than with the known methods.

After having prepared by brushing or rubbing with the molten solder the surfaces to be joined and having the unalloyed solder, one obtains surfaces which contain practically no oxide produced from the aluminum article. However, these surfaces may become covered again with an excessively thin layer of oxides produced from the metals which form the solder. These oxides are by far less harmful than the oxide film which coated the aluminum article, and the former reduce much less the mechanical strength of the united assemblage, since the solder is united by alloying to the whole aluminum surface of both pieces. It is nevertheless possible to improve further the assemblage in regard to resistance to corrosion in the following way:

After having put into the intended position the pieces to be soldered, one deposits at an adjacent spot the requisite molten solder and causes it to spread over the entire prepared surfaces to be joined. This may be done by means of a tool shaped for this operation (a scraper for instance), whilst at the same time the tool, passing through the joint, scrapes away any newly formed oxide film from the alloyed surfaces to be joined together. This operation is carried out preferably in the absence of air, for example under a non-oxidizing flame. The front edge of the moving tool carries away the oxide film whilst the back edge of the tool draws the liquid solder after itself into the joint, so that the prepared surface is protected from the possibility of becoming again oxidized and so that in the product the progress from the alloyed surface to the pure solder is a gradual and an uninterrupted one.

As a scraping tool one can use for instance a steel strip which has a form adapted to this operation with a handle and a part which serves as a scraper. By means of this tool one must remove the oxide film simultaneously from both prepared surfaces. To make this possible, the prepared surfaces must be able to be reached by the tool even when the pieces have been put into the final intended position. If for instance an aluminum strip has to be soldered perpendicularly upon an aluminum sheet, one bevels the lower edge of the strip so that after the pieces to be joined have been prepared and put into the final position the strip touches the sheet only by a sharp edge which sharp edge forms, for instance, at one side an angle of 45° with the sheet. One then uses a tool having an angle shaped to the joint, that is to say, the end of which forms an angle of 45° too. It is preferable that the end of the tool and the solder drawn after it are kept from contact with the air during this operation. The most simple manner to fulfil this condition is to direct the non-oxidizing flame of a burner or soldering lamp, which supplies partially or entirely the necessary heat, simultaneously on the place in front of the scraper, on the end of the scraper and on the solder drawn behind the scraper; one moves the flame and the tool simultaneously. In this way the access of air is prevented and the thin oxide film which tends to form on every soldering joint cannot be formed before the operation is terminated. Thus the inclusions of oxide, which impaired the soldered assemblages realized according to other methods, are practically avoided.

If the pieces to be joined are too large to be covered with the fresh solder by a single movement, this operation may be repeated once or several times, that is to say, one solders progressively, namely, by a first movement of a distance of 15 to 20 centimeters, for example, upon the pieces to be soldered, deposits then a new quantity of fresh solder on the spot where one has stopped, and continues then to solder on a second distance of 15 to 20 centimeters, and so on.

One can however perform a good joining of aluminum pieces also by spreading fresh molten solder on the whole of the prepared and alloyed surfaces either after or before having put the pieces into the final position and by removing the oxides with the scraper as disclosed above after having put the pieces into the final position. Of course by this method the liquid solder is not drawn on the whole surfaces by means of the scraper but the scraper is guided through the molten solder. In this way one removes practically all of the oxide inclusions and also the slag or oxide which floats on the surface of the molten solder.

It is known already that one can remove partially the slag by means of a metallic point by guiding this point through the molten solder along the soldering seam. This operation however is not the same as the operation according to the present invention but corresponds to the scumming of a molten metal by means of a hand ladle, as the point does not touch the whole of the prepared surfaces during this operation. As explained above, the scraper according to the present invention must have such a profile at its end that it touches simultaneously both prepared surfaces and draws away the very thin oxide film of the alloyed surfaces.

If one needs not the highest tensile strength and the highest resistance to corrosion, one can clean and brush the surfaces to be joined with molten solder according to known methods, that is to say without removing the unalloyed solder, and then, after having put the pieces into the final position, add fresh molten solder and carry out the scraping operation according to this invention, either guiding the scraper through the molten solder along the soldering seam or drawing the solder along the entire prepared surfaces by means of the scraper as has already been disclosed.

Of course it is possible to carry out this last method without adding fresh solder after having put the pieces into the final position, provided that a sufficient quantity of solder remains on the surfaces to be soldered after the brushing operation.

If a broken casting is to be repaired, the surfaces of the fracture must be filed, milled or planed before being soldered.

If a tube is to be soldered into a muff or coupling box (or into a tube of wider diameter), one cleans and preferably roughens the exterior surface of the end of the tube and the inner surface of the muff according to known methods. After this cleaning, one brushes or rubs with a molten solder and removes the unalloyed solder according to the present invention; it is advantageous to use for this operation a round rotatory and mechanically actuated wire brush. The surfaces being then prepared, one introduces, preferably by a rotatory movement, the end of the tube into the muff. During this operation, the oxide film which has formed itself on the prepared alloyed surfaces becomes eliminated to a great extent in a manner similar to that disclosed above (removing of the oxide film from the alloyed surface by means of a scraper). A complete elimination as in the case of the assemblage of an aluminum strip perpendicularly on an aluminum sheet is hardly possible. Of course the muff and the end of the tube must be heated at least to the temperature of the melting point of the solder when they are introduced the one in the other. When the end of the tube has been introduced into the muff, one brushes the joint at one of the ends of the muff with fresh molten solder, exactly as for the preparation of the surfaces to be soldered, and one keeps the joint away from the air by means of a non-oxidizing flame, and one supplies fresh solder. This solder runs between the tube and the muff on the whole length of the same (unless the joint between the tube and the muff be wholly air-tight) and fills thoroughly the space between the surfaces to be soldered.

This soldering of tubes into muffs or into tubes of a wider diameter could not be satisfactorily performed according to the known soldering processes. The new tube soldering method hereof can be advantageously used for the fabrication of tube frameworks, for instance for the fabrication of frames for bicycles. Till now there did not exist bicycles made from aluminum alloy with soldered frames. The aluminum alloy tubes were introduced into steel muffs without use of a solder (see for example "Revue de l'Aluminium", July—August 1933); the assemblage realized by this last method inevitably becomes loose after a few months use; this drawback does not exist with soldered tube frames.

The superiority of the new method can be also demonstrated particularly strikingly by the case of soldering large letters made from thin aluminum or aluminum alloy sheet, where the sheet strips are butt-soldered together perpendicularly. The soldering succeeds by this invention very well, when, if one has operated according to the known processes, and the already soldered parts of the letter separated again on account of the strains which occur by the soldering of the parts which are not yet bound or by deformations of the letter.

The new method is also applicable to the repairing of aluminum castings, as stated above.

In some cases, for example for the soldering of heat treated aluminum alloys (for instance of the alloys known under the registered marks Avional and Duralumin), it is advantageous to perform the preliminary brushing or rubbing with a low melting point solder and to perform the final soldering with a solder having a relatively high melting point and having better mechanical properties than the solder of low melting point. In this way one can obtain assemblages which have for example a superior tensile strength without the necessity of heating the pieces to a high temperature during both operations (brushing or rubbing and final soldering); the mechanical properties of the pieces are much less impaired than if the first operation be also carried out at a relatively high temperature.

For carrying out the method according to the present invention, solders of the following composition can be recommended:

|    |          | Parts |
|----|----------|-------|
| 1. | Zinc     | 25    |
|    | Cadmium  | 35    |
| 2. | Zinc     | 21    |
|    | Cadmium  | 80    |
| 3. | Zinc     | 21    |
|    | Cadmium  | 80    |
|    | Aluminum | 1½    |
| 4. | Tin      | 158   |
|    | Zinc     | 40    |
|    | Lead     | 2     |
| 5. | Tin      | 128   |
|    | Zinc     | 40    |
|    | Cadmium  | 30    |
|    | Lead     | 2     |
| 6. | Tin      | 80    |
|    | Zinc     | 8     |
|    | Cadmium  | 120   |
| 7. | Tin      | 194   |
|    | Zinc     | 6     |
|    | Aluminum | 5     |
| 8. | Tin      | 160   |
|    | Zinc     | 35    |
|    | Aluminum | 5½    |
| 9. | Tin      | 75    |
|    | Zinc     | 120   |
|    | Copper   | 4     |
|    | Lead     | 1     |
| 10.| Zinc     | 192   |
|    | Aluminum | 8     |
| 11.| Tin      | 5     |
|    | Zinc     | 189   |
|    | Aluminum | 11    |
| 12.| Zinc     | 10    |
|    | Cadmium  | 35    |
|    | Aluminum | 1½    |
| 13.| Zinc     | 20    |
|    | Cadmium  | 35    |
|    | Silver   | 5     |
| 14.| Zinc     | 5     |
|    | Cadmium  | 80    |
|    | Silver   | 6     |
| 15.| Zinc     | 21    |
|    | Cadmium  | 80    |
|    | Silver   | 4½    |

The above mentioned solders are only given as examples. Of course it is naturally possible to use other solders, provided that they have not a too high melting point and that they are sufficiently resistant to corrosion.

In the accompanying drawing Figs. 1 to 5 are sectional diagrams showing successively the steps of the present invention, with much exaggeration of thicknesses of materials.

Referring first to Fig. 1 there is shown a plate or piece A of aluminum, this being subjected to preliminary heating by the flame of a burner B. In Fig. 2 the same aluminum piece is shown with the first layer of solder C applied to its upper face, which may be performed in an ordinary manner as under the heating of the burner B. At Fig. 2 also is shown a metallic brush D located in readiness for the elimination of the solder layer in the presence of the non-oxidizing flame of a burner B'.

In Fig. 3 is shown the temporary result after the brushing away of the solder. As described the aluminum oxides are brushed away with the surplus solder, exposing the alloyed surface of the aluminum piece. At this stage inspection determines the completeness of alloying of the surface to be united. If not complete the coating and brushing steps are repeated until the entire area of the treated piece A carries a continuous alloy surface C' free of any appreciable defects. The aluminum piece A' is now ready and it is to be understood that the complementary aluminum piece A² has been similarly treated or prepared.

Fig. 4 shows the two pieces A' and A² held with their surfaces C¹ and C² in their approximate relative position for the next step, the non-oxidizing heat being continued. While in this condition a fresh layer or supply of solder E is applied adjacent the joint and entering the space between the two pieces. While held in their intended relation a scraping tool F is now passed through the joint between the two pieces. As shown in Fig. 4, this not only scrapes the two pieces, and again cleans them, but acts to draw the fresh solder E through the joint, until, as the tool emerges the space is completely filled. This action forces out the excess old solder and any oxides present. The two pieces with fresh solder may now be joined and pressed together into their final position and allowed to cool, and the operation is complete.

Fig. 5 shows a modification wherein the final solder is applied through the joint and the scraper F thereafter is forced through the space and through the solder, to clean out the joint and scrape the two surfaces, with the same result as with Fig. 4, in each case the result being a thoroughly soldered joint.

There has thus been described a new method for soldering aluminum or aluminum alloys without use of a flux. Many matters of method, operation and arrangement may be variously modified without departing from the principles of the invention, it is not intended to limit the invention to such matters except to the extent set forth in the appended claim.

What I claim is:

The method of uniting cleaned pieces of aluminum or aluminum alloy by a solder for which aluminum has an alloying attraction, comprising heating each piece at its surface to be joined to a temperature above the melting point of the solder and applying the solder to melt and cover wetly the surface, brushing thoroughly the surface by a non-melting metal tool or brush until aluminum oxides have been completely removed from the surface and until the surface has been completely alloyed with solder and until the surplus unalloyed solder has been brushed away and with it the oxides thus exposing the alloyed surface for inspection and determination of completeness of alloying of the surface, and repeating if necessary such application of solder and brushing operations until the entire surface carries a continuous alloy surface free of appreciable defects, holding the pieces in their intended joining relation and while still under heat applying fresh solder to their adjacent surfaces and then forcing out the excess solder and oxides by the passage through the joint of a scraper shaped to fit the joint so as to scrape both surfaces, followed by joining and pressing the pieces into final position and allowing them to cool.

CARL BANSCHER.